June 3, 1969  R. H. WEICHSEL  3,447,844
BEARING SYSTEMS
Filed March 9, 1967
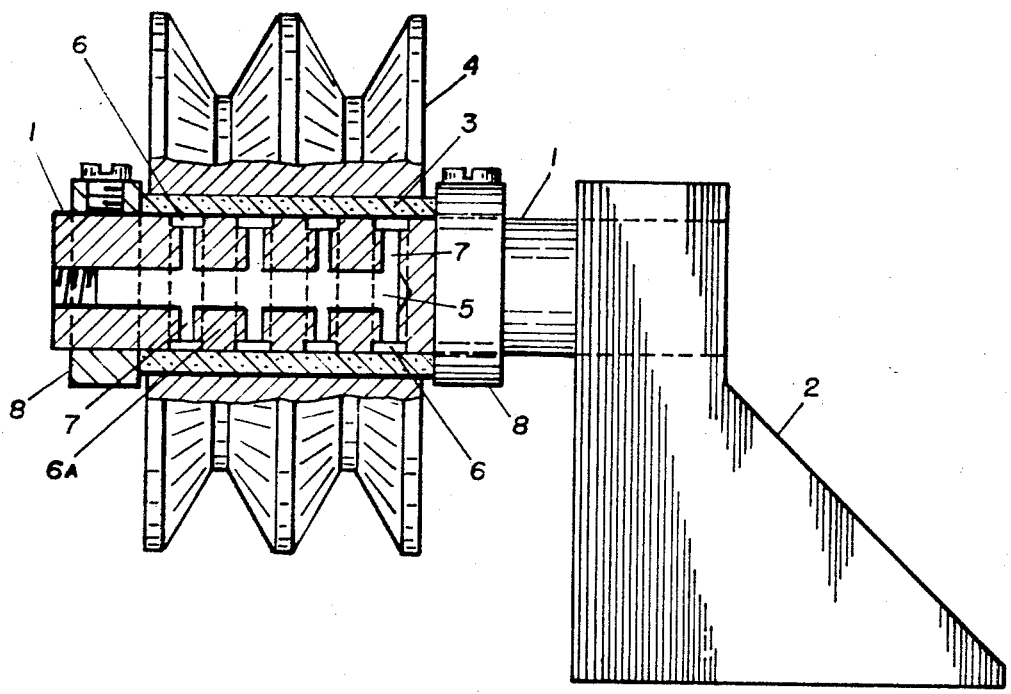
INVENTOR
Richard H. Weichsel
John Mahoney
ATTORNEY

1

3,447,844
BEARING SYSTEMS
Richard H. Weichsel, Hudson, Ohio, assignor to The Apex Bearings Company, a corporation of Ohio
Filed Mar. 9, 1967, Ser. No. 623,507
Int. Cl. F16c 1/24, 3/08, 33/66
U.S. Cl. 308—93    7 Claims

ABSTRACT OF THE DISCLOSURE

A stationary shaft is provided having a central bore, a plurality of spaced peripheral grooves, and conduit means leading from the central bore to the peripheral grooves. A stationary porous sleeve is mounted on said shaft and covers said grooves and a member, such as a pulley, is rotatable on said sleeve which pulley has a close tolerance with the sleeve but sufficient to enable a thin film of gas to be formed between the sleeve and the pulley. The sleeve is preferably composed of spherically-shaped copper particles encapsulated by sintered tin in the form of venturi-shaped pores and means is provided for passing a gas through the central bore of the shaft and the radial conduit means to said grooves and from thence through the venturi-shaped pores in said sleeve which restrict the flow of the gas which gas after passing through the porous sleeve expands to form a thin uniform bearing between the porous sleeve and the rotatable member. The thickness of the sleeve should be sufficient to support the static or at rest load at the working surface and the width of the peripheral grooves and the lands between them should be approximately the same thickness as the sleeve and the depth of the peripheral grooves should be approximately one-half of the thickness of the sleeve.

---

The present invention relates to bearing systems and more particularly to a bearing system in which a gas, such as air, exhaust engine gases, or the like, is uniformly distributed between a porous sleeve and the bore of a rotatable member.

To prevent vibration in a compressed gas bearing, there must be a limited amount of gas in combination with the lubricating gas film. In other words, there must be a restriction between the lubricating compressed gas film and a compressed gas source to isolate the air supply from the film to a sufficient extent to dampen vibrations. The restriction, however, must not be sufficient to prevent a flow of the gas to the film to provide pressure upon the film.

To provide gas bearing systems, it has heretofore been proposed to utilize a bearing having multiple holes leading to the gas film. In such bearings, however, the restriction varies with the thickness of the film and it is difficult to obtain a substantially uniform load supporting film. It has also been proposed to use mechanically-formed porous type bearings through which a gas may be passed to provide the film. In bearings of the mechanically-formed porous type, the restriction occurs ahead of the port of entry of the gas to the film. Restriction therefore does not vary with the thickness of the film as in the case of the multiple hole type bearing and consequently the bearing can be more easily loaded than with multiple hole feed bearings. In porous type bearings as previously provided, however, considerable turbulence occurs and it is difficult to provide a substantially uniform gas bearing for the rotatable member.

In accordance with the present invention, a bearing system is provided including a shaft, a porous sleeve mounted on the shaft, a member having an inner bore which is rotatably mounted on the sleeve and means for forcing a gas through the porous sleeve to provide a substantially uniform gas bearing for the rotatable member.

My invention will be better understood by reference to the accompanying drawing in which the single figure is partly an elevational and partly a cross sectional view of my improved system.

As illustraated in the drawing, a shaft 1 is supported in cantilever fashion upon a stanchion 2 and means is provided for forming a gas bearing between a porous sleeve 3 surrounding the shaft and a member 4 having a bore which is rotatable about the sleeve. For this purpose, a central bore 5 is formed in the shaft which terminates a short distance from the end of the porous sleeve surrounding the shaft. As shown in the drawing, a plurality of spaced grooves 6 are cut in the outer periphery of the shaft which are connected to conduit means 7 which communicate with the central bore 5. The number of circular grooves 6 may of course be varied depending upon the length of the porous sleeve. As shown in the drawings, there are four circular grooves and upwardly and downwardly extending conduit means 7 lead from the central bore to each circular groove. For supplying a gas to the bore of the shaft, the open end of the central bore of the shaft may be tapped to receive conduit means leading from a suitable source of gas, such as air, under pressure.

In operation, the gas under pressure passes from the bore 5 and conduit means 7 into the circular grooves 6 and from the circular grooves through the porous sleeve 3 and forms a gas bearing between the outside diameter of the sleeve 1 and the rotatable member 4.

While the sleeve may be formed of any suitable porous material affording sufficient feed therethrough to provide and sustain a substantially uniform film between the sleeve and the rotary member under load, it is preferably composed of a commercially available material, such as "Oilite" which consists of a body composed of small copper spheres of approximately 100 mesh and of substantially uniform size which are encapsulated by sintered tin particles. In preparing the sleeve, the copper in the form of sphere-like particles of approximately 100 mesh is mixed with similarly shaped tin particles of approximately 200 mesh and the mixture is first pressed into a unitary structure and sufficient heat is then applied to sinter the tin. A temperature of approximately 1535° Fahrenheit may be used. The temperature, however, should not be sufficient to liquefy the copper. The copper therefore retains its spherical-like shape and is encapsulated by the sintered tin particles which form a myriad of venturi-shaped pores in which the gas passing through the sleeve meets its maximum restriction as is evidenced by a substantial pressure drop. After the gas passes outwardly through the venturi-shaped pores, it expands to form a thin, nonturbulent film of gas which lies in close proximity to the outside diameter of the porous sleeve.

In preparing the sleeve 3, the small copper spheres preferably constitute the major proportion of the sleeve and while I do not desire to be limited to any particular proportions, the copper may be present in an amount ranging from approximately 60% to 90% and the tin in proportions ranging from approximately 10% to 40%. For instance, a sleeve may be composed of approximately 90% copper spheres and 10% of sintered tin.

To properly supply the porous metal sleeve with a sufficient amount of gas, the construction should be of a nature to allow the pressure head to be uniform at the working surface. To obtain this uniform head, the normal linear wall thickness of the sleeve should be in keeping with that which is required to support the static or at rest load at the working surface. Having thus established the lateral wall thickness of the sleeve, this linear measurement should constitute the width of both the channels or grooves 6 and the ribs or lands 6a. In such case, the depth of the grooves 6 should be one-half of the width of a groove. With such an arrangement, a gas, such as air, flowing from bore 5 and conduit means 7 into grooves 6, is first restricted by the venturi-shaped pores or orifices in the sleeve and then expands to form a thin, nonturbulent uniform film between the sleeve 3 and the rotatable member 4.

In preparing the bearing, the outside diameter of the shaft and the inside diameter of the sleeve may be substantially equal. It will of course be understood that the outside diameter of the shaft may vary from minus .00025 to its nominal diameter and is a like manner the inside diameter of the sleeve may vary from plus .00025 to its nominal diameter. In such case, the shaft may be cooled to 0° Fahrenheit and the porous sleeve may be heated to approximately 250° Fahrenheit and while at such temperatures the sleeve 3 may be slipped over the shaft and when the assembly attains room temperature, a substantially unitary structure is formed in which the sleeve 3 is bound to the shaft 1.

As shown in the drawing, the rotary member 4 is in the form of a double pulley which may have a tolerance of approximately .001 of an inch with the sleeve 3. The rotatable member may, however, be of any desired type, such as a sprocket, gear, or another tube having the desired tolerance with the sleeve 3.

Collars 8 are provided to prevent endwise movement of sleeve 3 and to provide spaces at the opposite ends of the rotatable member through which the gas from the film formed between the porous sleeve and the rotary member may pass.

What I claim is:

1. A bearing system including a shaft having an axial bore therein and being provided with peripheral groove means, a porous sleeve surrounding said shaft and covering said groove means, a rotatable member on said sleeve, conduit means leading from the bore of said shaft to said groove means, means secured to said shaft at the opposite ends of said sleeve which engage and prevent endwise movement of said sleeve, and means whereby a gas under pressure may be passed through the bore of said shaft and through said conduit means to said peripheral groove means and from thence through the porous sleeve to provide a bearing for said rotatable member.

2. A bearing system as defined in claim 1 in which the means for preventnig endwise movement of the sleeve are in the form of peripheral collars, one of which is secured to the shaft adjacent to one end of the sleeve and the other of which is secured to said shaft adjacent to the opposite end of said sleeve.

3. A bearing system as defined in claim 2 in which the collars extend outwardly relative to the sleeve and are spaced from the opposite ends of the rotatable member to provide spaces between the rotatable member and the collars for the egress of gas passing through the porous sleeve.

4. A bearing system as defined in claim 1 in which said sleeve is of sufficient thickness to support a load at rest and in which the groove means consists of a plurality of spaced peripheral grooves, the width of each of which is substantially the same as the thickness of said sleeve and in which the conduit means leads from said bore to each of said grooves.

5. A bearing system as defined in claim 1 in which the conduit means consists of oppositely disposed passages leading from the bore of the shaft to each of the peripheral grooves.

6. A bearing as defined in claim 4 in which peripheral lands formed integral with the shaft are of substantially the same width as the thickness of the sleeve and separate the peripheral grooves from each other and the porous sleeve includes a myriad of venturi-shaped openings for restricting the passage of gas through the porous sleeve to form a thin nonturbulent film between said sleeve and the rotatable member as the gas emerges from the venturi-shaped openings.

7. A bearing as defined in claim 6 in which the peripheral lands formed integral with the shaft separate the peripheral grooves from each other and the sleeve includes a myriad of venturi-shaped openings for restricting the passage of gas through the porous sleeve and said sleeve being of sufficient thickness to support a load at rest and said groove and intervening lands being of substantially the same width as the thickness of the porous sleeve and the depth of each groove being approximately one-half of the width of each groove, and a pair of oppositely disposed conduit means leading from the axial bore of the shaft to each of said grooves so that when a gas under pressure is passed through the axial bore of said shaft and said conduit means and from thence through the venturi-shaped openings in said sleeve, a thin nonturbulent uniform gas film is formed between said sleeve and the rotatable member as gas emerges from the venturi-shaped openings in said sleeve.

References Cited

UNITED STATES PATENTS

| | | | |
|---|---|---|---|
| 2,610,096 | 9/1952 | Mallory | 308—122 |
| 2,696,410 | 12/1954 | Topanelian | 308—9 |
| 2,855,249 | 10/1958 | Gerard | 308—122 |
| 2,610,096 | 9/1952 | Mallory | 308—122 |
| 2,696,410 | 12/1954 | Topanelian | 308—9 |
| 2,855,249 | 10/1958 | Gerard | 308—122 |
| 3,374,039 | 3/1968 | Voorhies | 308—122 X |

CARROLL B. DORRITY, JR., *Primary Examiner.*

U.S. Cl. X.R.

308—9